United States Patent [19]

Bollen

[11] 4,363,929
[45] Dec. 14, 1982

[54] PAPER THERMOCOUPLE BODY

[75] Inventor: Theo P. C. Bollen, Genk, Belgium

[73] Assignee: Electro-Nite Co., Philadelphia, Pa.

[21] Appl. No.: 219,471

[22] Filed: Dec. 23, 1980

[30] Foreign Application Priority Data

Jan. 4, 1980 [DE] Fed. Rep. of Germany ....... 3000174

[51] Int. Cl.³ .......................... G01K 1/12; G01K 7/00
[52] U.S. Cl. .................... 136/234; 29/573;
156/299; 374/139; 374/179
[58] Field of Search ...................... 136/234, 230, 233;
493/374, 379, 963, 949; 73/DIG. 9, 354;
156/299

[56] References Cited

U.S. PATENT DOCUMENTS

| 2,390,721 | 12/1945 | Mallgraf | 493/110 X |
| 2,998,840 | 9/1961 | Davis | 493/949 X |
| 3,225,509 | 12/1965 | May | 493/968 X |
| 3,559,452 | 2/1971 | Perbix et al. | 73/354 X |
| 3,698,954 | 10/1972 | Jones, Jr. | 136/234 |
| 3,725,134 | 4/1973 | Gessner et al. | 136/234 |
| 4,294,643 | 10/1981 | Tadewald | 156/299 X |

FOREIGN PATENT DOCUMENTS 956324 4/1964 United Kingdom ............... 136/234

Primary Examiner—Daniel M. Yasich
Attorney, Agent, or Firm—Seidel, Gonda, Goldhammer & Panitch

[57] ABSTRACT

A disposable thermocouple body is made from a lamination of flat paper plates. Sets of paper plates are of progressively increasing width up to the middle plate which supports a U-shaped thermocouple shield. The body is adapted to be mounted in one end of a lance for immersion into a molten metal bath.

11 Claims, 4 Drawing Figures

PAPER THERMOCOUPLE BODY

BACKGROUND

Disposable immersion thermocouples are known for measuring the temperature of a molten metal bath. Such structure involves a thermocouple body which is attached to the immersion end of a lance. The lance includes a coupling member for coupling contacts on the thermocouple body to circuitry associated with a recording instrument. The thermocouple hot junction is disposed within a U-shaped shield supported by the thermocouple body.

Thermocouple bodies are generally a cylindrical base made from an insulating material such as ceramic, refractory, sand, plastic, etc. The body usually terminates at the end remote from the thermocouple in a plastic coupling member supporting a pair of bare contacts.

Use of refractory materials for the thermocouple body is expensive. Fully automatic equipment has not heretofore been developed for making and assembling a thermocouple subassembly for insertion in one end of the lance since a number of operations have to be performed by hand. Ceramics and sand when used as the thermocouple body are fragile and tend to break during assembly or during shipment if they are dropped. Thermocouple bodies made from ceramic, refractory or sand require the application of heat to cure the same.

The present invention solves the problem of how to make a thermocouple body which eliminates the use of refractory and plastic materials while at the same time is made from an insulating material which will withstand immersion temperatures in a bath of molten metal for a sufficient period of time to enable a temperature reading to be obtained.

SUMMARY OF THE INVENTION

The present invention is directed to a disposable measuring head for use in sensing the temperature of a bath of molten metal by immersion therein. The measuring head includes a U-shaped thermocouple and shield supported by a body. The body is defined by a plurality of discrete flat plates having their juxtaposed major faces laminated together. A plurality of centrally disposed plates are longer than the other plates. At least one of the centrally disposed plates supports said thermocouple shield.

In a preferred embodiment of the present invention, the plates are generally rectangular and made from paper or paperboard. The paper or paperboard plates are arranged in sets, with the width of the sets becomming increasingly larger toward the center of the body so as to define a generally cylindrical body.

It is an object of the present invention to provide a novel disposable measuring head which includes a thermocouple and which does not include refractory or plastic materials.

It is another object of the present invention to provide a measuring head which may be produced economically in a completely automated production cycle.

It is another object of the present invention to provide a disposable measuring head which is made from an insulating material which has very high resistance to fracture.

Other objects and advantages will appear hereinafter.

For the purpose of illustrating the invention, there is provided in the drawings a form which is presently preferred; it being understood, however, that this invention is not limited to the precise arrangements and instrumentalities shown.

FIG. 4 is a bottom view of the measuring head shown in FIG. 3.

DETAILED DESCRIPTION

Figure 1:
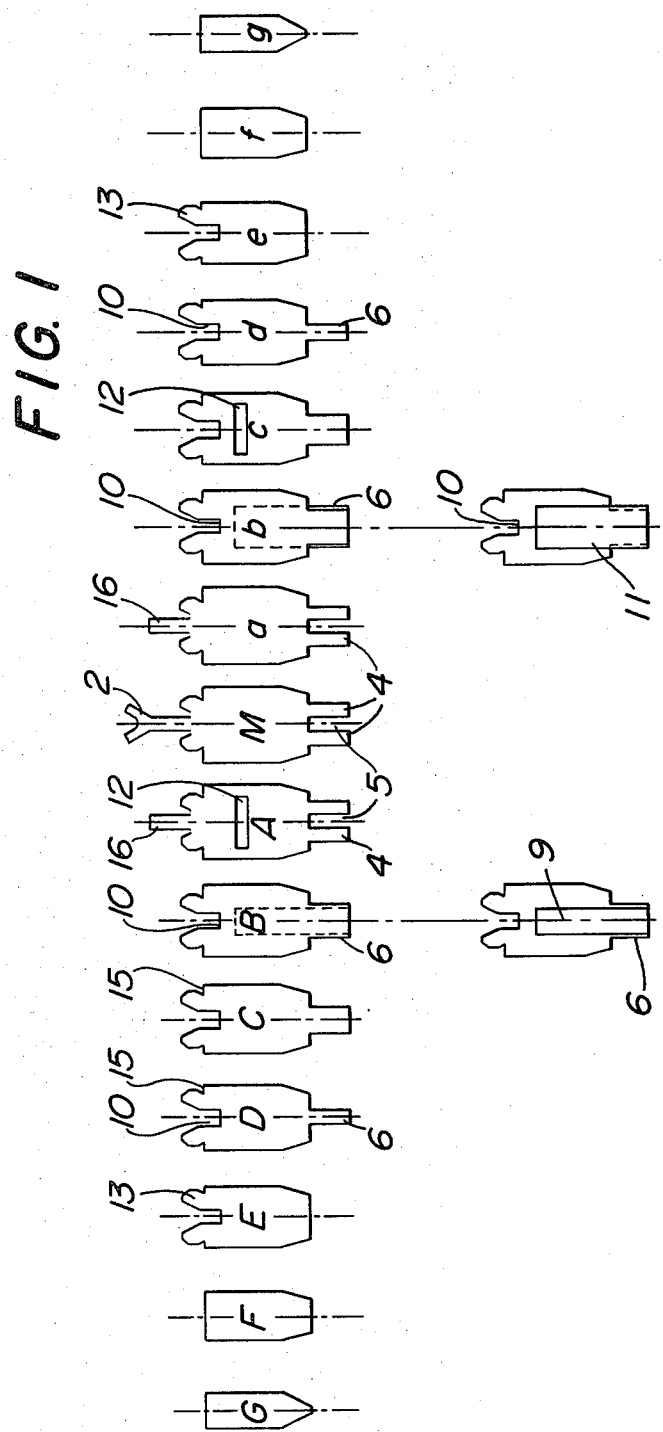
FIG. 1 is a plan view of the individual plates which are to be joined to one another to form a generally cylindrical thermocouple body, with two of the plates being illustrated in a manner to show the opposite faces thereof.
Figures 2, 3:
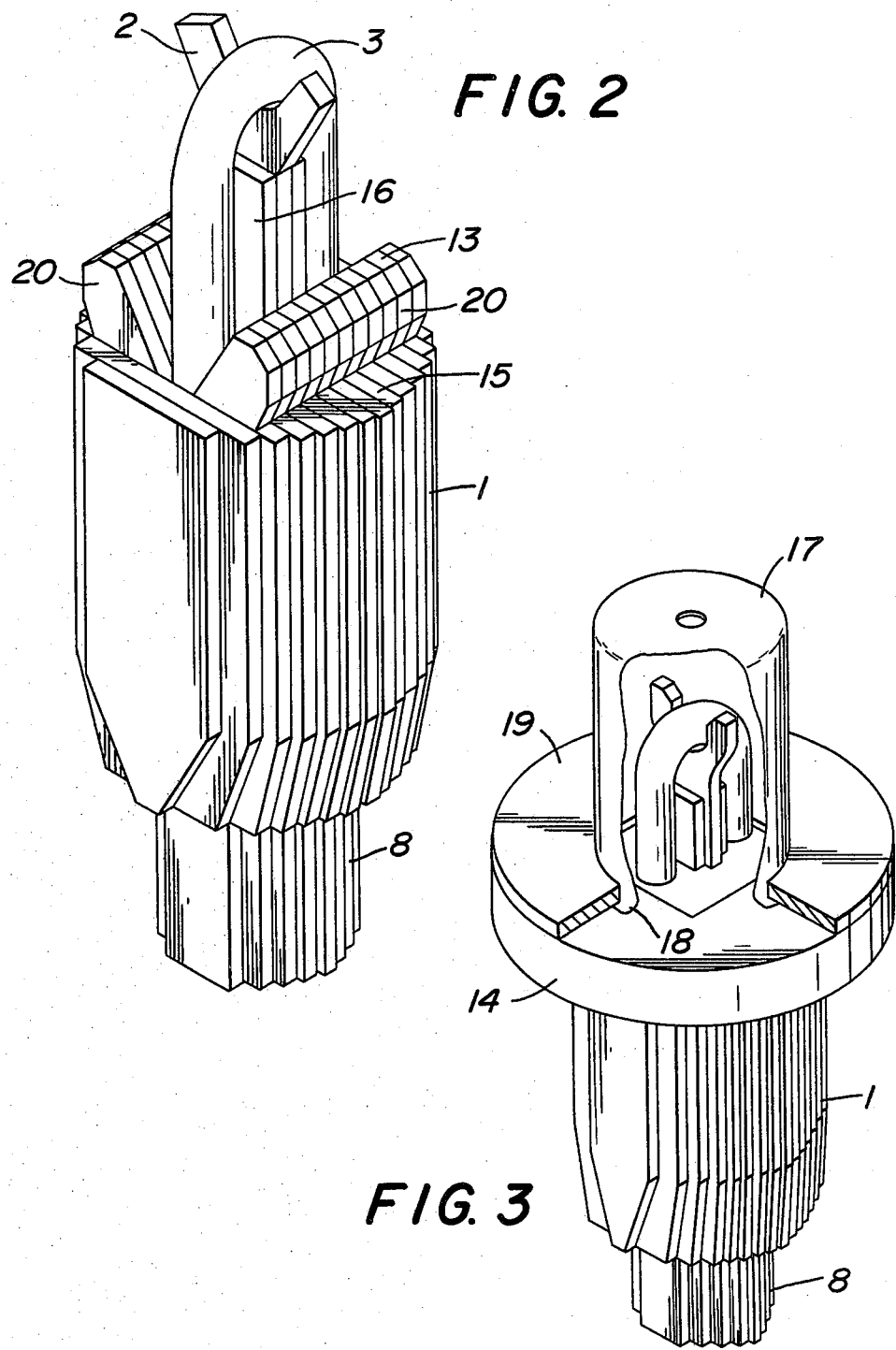
FIG. 2 is a perspective of the thermocouple body assembled from the plates shown in FIG. 1.
FIG. 3 is a perspective view of a disposable measuring head in accordance with the present invention.

Referring to FIGS. 2 and 3, there is illustrated a thermcouple body in accordance with the present invention designated generally as 1. The body 1 is a laminate of a plurality of plates of insulating material. In FIG. 1, there is shown a plan view of sets of plates to be joined together to form the body 1.

Referring to FIG. 1, the plates are designated by the sets Aa, Bb, Cc, Dd, Ed, Ff and Gg. There is also provided a centrally disposed plate M. The plates are of substantially rectangular shape. The central plate M is the widest plate. The width of the plates progressively decreases in opposite directions from the central plate M. That is, plates g is narrower than plate f, plate f is narrower than plate e, etc. The central plate M has a centrally disposed upstanding projection 2 which is generally Y-shaped. The projection 2 is adapted to support the bight of a thermally transparent U-shaped thermocouple shield 3.

The lower ends of plates M, A, and a are forked so as to define a pair of projections 4 with a central slot or recess 5 therebetween. The plates of set B, b have a tongue-like projection 6 whose size is approximately the same as the size of the projections 4. Projections 6 lack any central slot or recess. When the plates B, A, M, a, b are juxtaposed and laminated together in that sequence, there is defined a cavity 7 having a rectangular or square cross-section at the bottom end of the thermocouple body 1 and constituting part of the coupling for connecting the measuring head to an electrical coupling member in a lance.

Other plates can have a tongue-like projection at their lower ends. In the embodiment shown in the drawings, plates c, d, C and D have projections as aforesaid but decreasing in width so as to be narrower than the projections 6. Other plates such as e, f, g, E, F and G do not have any tongue-like bottom projection.

The aforesaid tongue-like bottom projections cooperate with each other when the plates are laminated together to define a projection 8 as shown in FIG. 3. Projection 8 is generally cylindrical on its outer periphery and the central cavity 7 is disposed therein. See FIG. 4. Projection 8 forms one part of a coupling for connecting the body 1 to an electrical coupling member in a lance.

In order to form an electrical contact point, one surface on the tongue-like projection 6 facing cavity 7 is provided with a conductive material. As shown in FIG. 1, plate B has an electrical conductor 9 coated thereon. The width of coating 9 is narrower than the width of the tongue-like projection 6. The coating 9 extends from the bottom end of projection 6 up to an upper end portion of the plate B. The coating 9 can be a layer of copper foil and terminates below a central rectangular slot 10 formed in plate B. A similar slot 10 is provided in adjacent plates such as plates E, D, C, b, c, d and e. The slots 10 define an opening for receiving the legs of the U-shaped shield 3. The slots 10 facilitate uniform repetitive location of the ends of the shield 3 whereby the hot junction will repetitively be located at the same location on the body. Hence, there should be uniformity of results when measuring temperatures of molten baths.

Another electrical contact is provided on plate b. In this regard, one surface of the tongue-like projection 6 on plate b, remote from the cavity 7, is provided with a coating 11 of electrically conductive material such as copper foil. Coating 11 extends for approximately the same height as the coating 9. However, coating 11 is wider than the tongue-like projection 6 and extends around the side edges of the projection 6 as will be apparent from FIG. 1.

Thermocouple wires are provided within the shield 3 in a conventional manner with exposed ends. The exposed ends can be secured to the conductive coatings 9, 11 in a simple manner. Thus, the exposed ends of the thermocouple wires are clamped by adjacent plates. In this regard, the juxtaposed surface of the adjacent plates A and c are provided with a narrow transverse conductive coating 12. When the plates are fitted together, the exposed ends of the thermocouple wires are thereby clamped between two conductive layers.

Referring to FIG. 1, the rectangular slots 10 in the various plates as shown therein need not be made of the same length. If the legs of the U-shaped shield 3 are of different lengths, the depth of the slots 10 on plates disposed to one side of the middle plate M may be longer or shorter than the length of the slots 10 on the opposite side of the middle plate M. In FIG. 1, the slots 10 in plates b-e are somewhat longer than the slots 10 in plates B-E.

The top edges 15 of most of the plates have a pair of upwardly extending projections 13. The inner edge of the projections are angled outwardly and are symmetrical to the center line of the body 1. The outer edges 20 of the projections 13 define a bearing for a central apperture in a disk 14. The disk 14 has a thickness approximately equal to the height of the projections 13. The disk 14 is placed on top of the body 1 and clamped to the bearing surfaces 20 on the projections 13. Disk 14 is supported from below by the top edges 15 of the various plates and on the top edges of one or more of the outermost plates f, g, F, G which do not have projections corresponding to projections 13. Disk 14 has a diameter greater than the width of plate M so as to be a radially outwardly extending flange for contact with an end face of a lance tube.

As illustrated in FIG. 2, the edges 20 of the projections 13 form a substantially square bearing surface which could be arcuate if desired. The plates a, A immediately adjacent the central plate M also have upwardly extending tongue-like projections 16 which reinforce the Y-shaped projection 2 on the plate M. The distance between the legs of the shield 3 corresponds to the combined thickness of projections 2 and 16 whereby the legs of the shield 3 contact the outer surfaces of the projections 16.

The parts of the measuring head projecting above the disk 14 are covered by a metal cap 17 as shown more clearly in FIG. 3. The bottom open end of the cap 17 has an outwardly extending flange 18. A plate 19 formed with a central opening overlies the flange 18 and is preferably adhesively bonded to the disk 14. The cavity surrounding the legs of the shield 3 can be filled with refractory cement if desired.

Measuring heads in accordance with the present invention can be manufactured in a simple, economical and fully automatic manner. The individual plates are manufactured by being punched out from a strip of suitable paperboard having a thickness of about 1 millimeter and containing minimal residual moisture so as to be substantially moisture-free. The individual plates can be laminated to one another by adhesive bonding. I prefer to spray coat one surface of each plate except plate M with a pressure sensitive adhesive. Two or more of the plates on each side of the central plate M can be combined and made from one piece of suitably thicker material.

The approximately rectangular portion of the plates may be approximately 25 millimeters high, the height of the projections 13 may be about 5 millimeters, and the length of the tongue-like projection 6 may be about 10 millimeters. The width of the central plate M can be about 15 to 20 millimeters, so that a cylindrical body 1 having a diameter of about 15 to 20 millimeters can be formed if a suitable number of plates is used. These dimensions are for purposes of illustration only. Thus, larger or smaller measuring heads can be manufactured using the teachings of the present invention. A thermocouple measuring head in accordance with the present invention is generally cylindrical and may be easily force-fit up to disk 14 into the end of a lance such as a paperboard tube for subsequent immersion into a molten metal bath.

The present invention may be embodied in other specific forms without departing from the spirit or essential attributes thereof and, accordingly, reference should be made to the appended claims, rather than to the foregoing specification, as indicating the scope of the invention.

I claim:

1. A disposable measuring head for sensing the temperature of a molten metal bath comprising a U-shaped thermocouple shield, a thermocouple supported within said shield, an insulating body supporting said shield, the body being characterized by a plurality of discrete flat plates having major faces laminated together, a plurality of the centrally disposed plates being longer than other plates, at least one of the centrally disposed plates having means supporting said shield at one end of the body an electrical contact means partially exposed on at least two of said plates, said contact means being electrically coupled to said thermocouple.

2. A measuring head in accordance with claim 1 wherein said plates are generally rectangular and of progressively varying widths so as to define a body which is generally cylindrical.

3. A measuring head in accordance with claim 2 wherein said plates are paper or paperboard.

4. A measuring head in accordance with claim 1 wherein said two plates have an extension at the other end of the body with each extension having an electrically conductive layer thereon for forming an electrical coupling, each conductive layer being electrically coupled to one discrete end of the thermocouple.

5. A measuring head in accordance with claim 1 wherein said plates are made in pairs of the same size, each plate of each pair being on opposite sides of the centermost plate and uniformly spaced therefrom.

6. A measuring head in accordance with claim 1 wherein the centrally disposed plates supporting said shield includes at least one upstanding Y-shaped projection for contacting the bight of the shield.

7. A measuring head in accordance with claim 1 wherein a plurality of centrally disposed plates at the other end of the body remote from said shield being provided with forklike projections spaced from one another so as to define a cavity at the end of the body remote from the shield, and additional plates adjacent to said central plates being formed with a tongue-like projection of substantially the same size as said above-mentioned projections but without a central cavity so as to define a side wall of the cavity.

8. A measuring head in accordance with claim 1 wherein said two plates have an electrical conductor in the form of a flat coating or foil on a projection extending in a direction away from said shield at one end of the body.

9. A measuring head in accordance with claim 1 wherein a plurality of the plates at one end thereof have a rectangular recess for receiving a portion of one leg of said shield.

10. A measuring head in accordance with claim 1 wherein at least a majority of said plates are made from paperboard having a thickness of about 1 millimeter.

11. A disposable measuring head for sensing the temperature of a molten metal bath comprising a U-shaped thermocouple shield, a thermocouple supported within said shield, a generally cylindrical body supporting said shield, the body being characterized by a plurality of discrete flat insulating plates made from paper and having major faces bonded together, a plurality of centrally disposed plates being longer than other plates, at least one of the centrally disposed plates having means supporting said shield at one end of the body, said plates being generally rectangular and of progressively varying widths, at least two of the plates have an extension at the other end of the body with each extension having an electrically conductive layer thereon for forming an electrical coupling, each conductive layer being electrically coupled to one discrete end of the thermocouple.

* * * * *